(12) United States Patent
Emi et al.

(10) Patent No.: US 10,277,805 B2
(45) Date of Patent: Apr. 30, 2019

(54) MONITORING SYSTEM AND CAMERA DEVICE

(71) Applicant: HITACHI KOKUSAI ELECTRIC INC., Tokyo (JP)

(72) Inventors: Hirofumi Emi, Tokyo (JP); Tomohiro Aikawa, Tokyo (JP); Masaru Fujii, Tokyo (JP); Naoki Saotome, Tokyo (JP); Kei Takahashi, Tokyo (JP); Shigeyuki Murata, Tokyo (JP); Atsushi Honda, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 7 days.

(21) Appl. No.: 15/314,663

(22) PCT Filed: May 29, 2015

(86) PCT No.: PCT/JP2015/065580
§ 371 (c)(1),
(2) Date: Nov. 29, 2016

(87) PCT Pub. No.: WO2015/182751
PCT Pub. Date: Dec. 3, 2015

(65) Prior Publication Data
US 2017/0195556 A1 Jul. 6, 2017

(30) Foreign Application Priority Data

May 30, 2014 (JP) .................................. 2014-112890

(51) Int. Cl.
*H04N 5/232* (2006.01)
*H04N 5/225* (2006.01)
(Continued)

(52) U.S. Cl.
CPC ..... *H04N 5/23222* (2013.01); *G08B 13/1961* (2013.01); *G08B 13/19604* (2013.01);
(Continued)

(58) Field of Classification Search
CPC .... H04N 5/225; H04N 5/2256; H04N 5/2322; H04N 7/181; H04N 19/154;
(Continued)

(56) References Cited

U.S. PATENT DOCUMENTS 5,128,769 A * 7/1992 Arai ....................... H04N 5/238
358/228
7,433,493 B1 * 10/2008 Miyoshi ................. G06K 9/00
382/103
(Continued)

FOREIGN PATENT DOCUMENTS

JP 2006-033385 A 2/2006
JP 2007-189369 A 7/2007
(Continued)

OTHER PUBLICATIONS

International Search Report dated Aug. 18, 2015.
(Continued)

*Primary Examiner* — Marly S Camargo
(74) *Attorney, Agent, or Firm* — Bacon & Thomas, PLLC

(57) ABSTRACT

In a monitoring system, each individual camera device divides image data acquired by an image sensor unit into a plurality of areas, and detects video-image abnormality from an average luminance signal value in each area or from a change thereof. The camera device that has detected video abnormality transmits video-image abnormality detection information to a server. In the plurality of areas, it is possible to use different detection algorithms such as a first algorithm in which it is determined that an abnormality has occurred when there is no change in the average luminance value, a
(Continued)

second algorithm in which it is determined that an abnormality has occurred when there is a change in the average luminance value, and a third algorithm for observing a change in the video captured while a change is made to an aperture, exposure time, or the like.

2 Claims, 9 Drawing Sheets

(51) Int. Cl.
H04N 7/18 (2006.01)
H04N 17/00 (2006.01)
H04N 21/21 (2011.01)
H04N 21/23 (2011.01)
H04N 19/15 (2014.01)
H04N 21/44 (2011.01)
G08B 13/196 (2006.01)
G08B 29/00 (2006.01)
G08B 25/00 (2006.01)
H04N 19/154 (2014.01)
H04N 21/218 (2011.01)
H04N 21/234 (2011.01)

(52) U.S. Cl.
CPC ............. *G08B 25/00* (2013.01); *G08B 29/00* (2013.01); *H04N 5/225* (2013.01); *H04N 5/2256* (2013.01); *H04N 7/18* (2013.01); *H04N 7/181* (2013.01); *H04N 17/002* (2013.01); *H04N 19/154* (2014.11); *H04N 21/218* (2013.01); *H04N 21/21805* (2013.01); *H04N 21/23418* (2013.01); *H04N 21/44008* (2013.01); *G06T 2207/20172* (2013.01)

(58) Field of Classification Search
CPC ....... H04N 21/44008; H04N 21/23418; H04N 21/218; G08B 13/19604; G08B 13/1961; G08B 25/00; G08B 29/00; G06K 9/00
USPC ... 348/241, 25–30, 131, 132, 153, 234, 235, 348/159, 143, 246, 247, 211.3, 211.8, 348/211.13, 222.1, 296.1, 333.01, 421.1, 348/687, 619; 382/164, 171, 173, 272, 382/274

See application file for complete search history.

(56) References Cited

U.S. PATENT DOCUMENTS

| 2002/0006163 | A1* | 1/2002 | Hibi ........................ H04N 7/12 375/240.16 |
| 2005/0286797 | A1* | 12/2005 | Hayashi .................. G06K 9/40 382/274 |
| 2006/0045185 | A1* | 3/2006 | Kiryati .................. H04N 11/02 375/240.16 |
| 2012/0026326 | A1 | 2/2012 | Itoh et al. |
| 2013/0044964 | A1* | 2/2013 | Ogura .................. G08B 29/046 382/260 |
| 2013/0113934 | A1* | 5/2013 | Hotta ....................... H04N 7/18 348/143 |
| 2014/0016005 | A1* | 1/2014 | Kishima ................ H04N 5/367 348/246 |
| 2015/0146006 | A1* | 5/2015 | Kawano ............ H04N 5/23293 348/159 |
| 2015/0262068 | A1* | 9/2015 | Ruan ...................... G06N 5/047 382/118 |

FOREIGN PATENT DOCUMENTS

| JP | 2009-118427 A | 5/2009 |
| JP | 2011-197937 A | 10/2011 |
| JP | 2012-028992 A | 2/2012 |
| JP | 2012-138768 A | 7/2012 |
| JP | 2012-170011 A | 9/2012 |
| JP | 2013-41400 A | 2/2013 |

OTHER PUBLICATIONS

Extended European Search Report dated Jan. 18, 2018 issued in corresponding European Patent Application No. 15800542.1.
Japanese Office Action dated Jan. 24, 2018 issued in corresponding Japanese Patent Application No. 2016-523579 and English machine translation thereof.

* cited by examiner

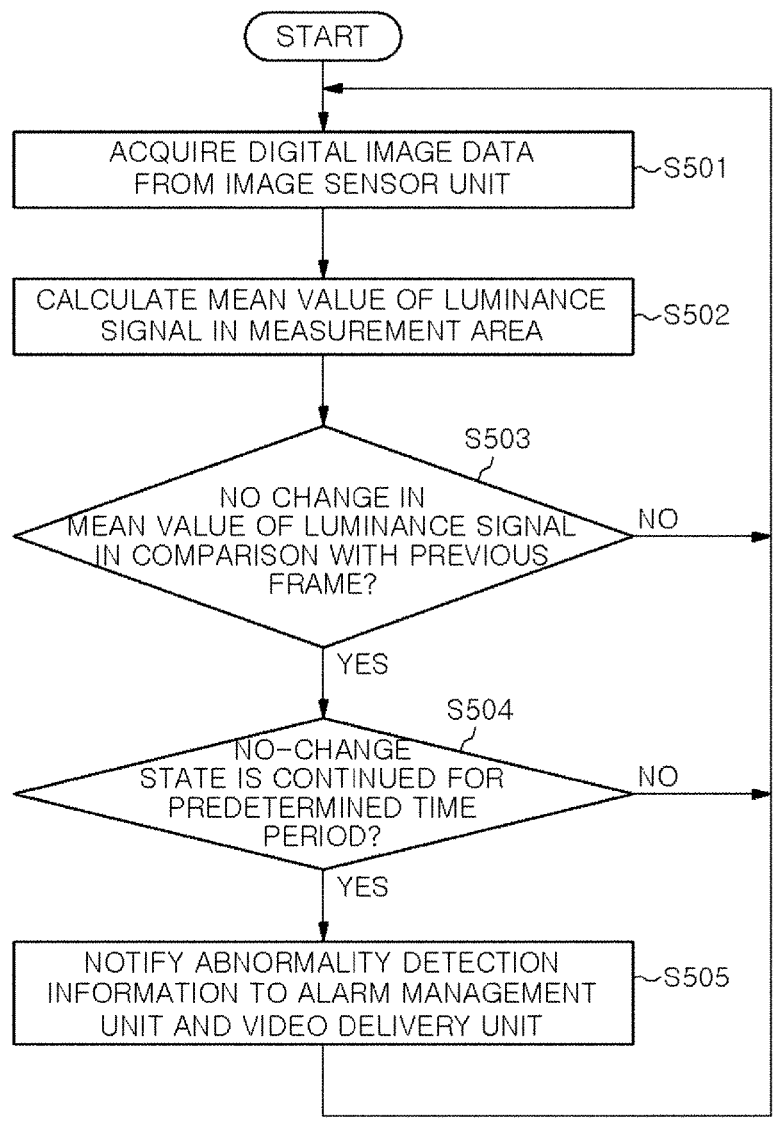

(A) DIGITAL IMAGE DATA (B) LEVEL CHANGE IN MEAN VALUE OF LUMINANCE SIGNAL FOR HUMAN BEING 111

(C) LEVEL CHANGE IN MEAN VALUE OF LUMINANCE FOR STREET LAMP 112

(D) LEVEL CHANGE IN MEAN VALUE OF LUMINANCE SIGNAL FOR AREA 713

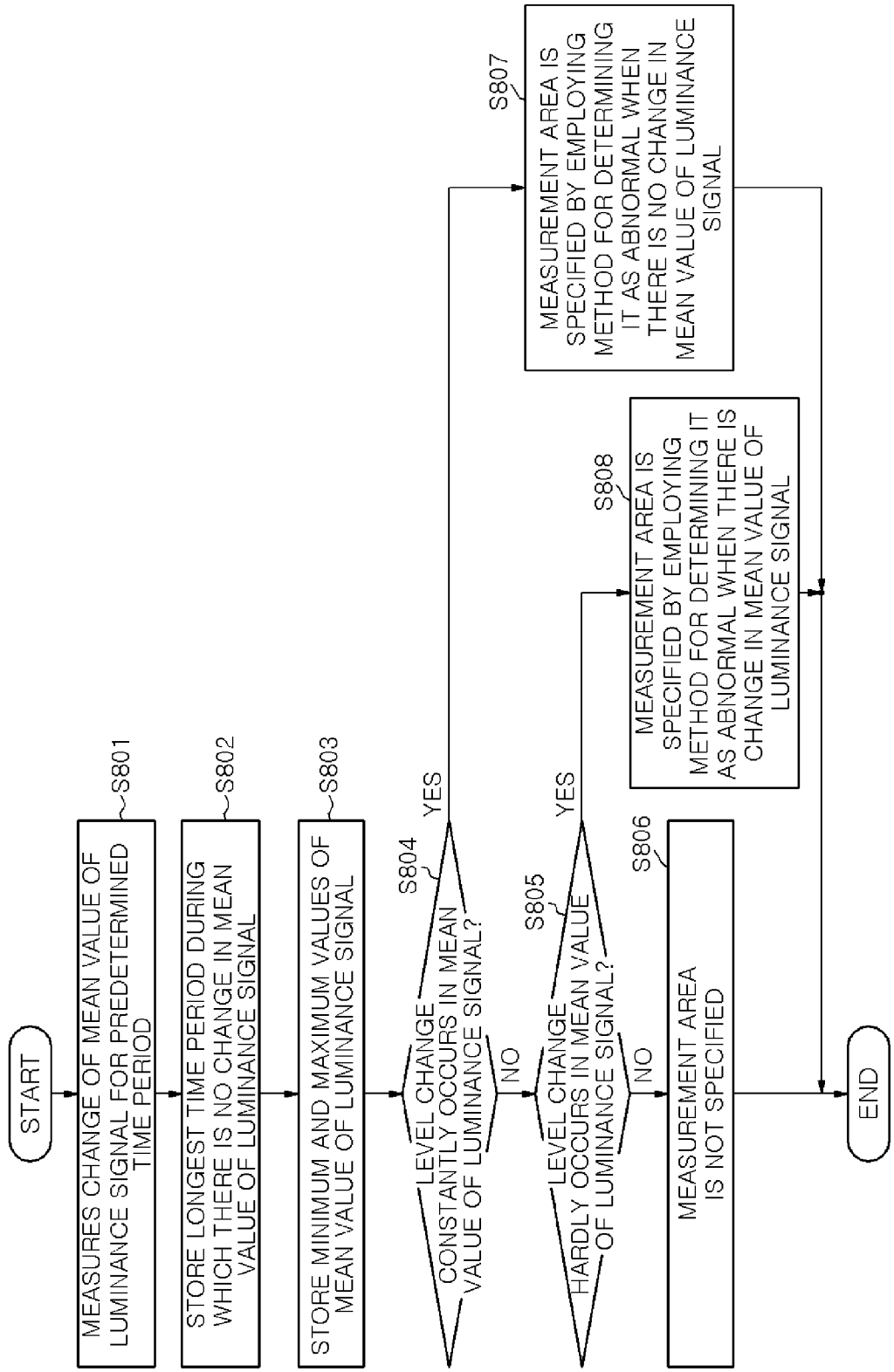

MONITORING SYSTEM AND CAMERA DEVICE

FIELD OF THE INVENTION

The present invention relates to a monitoring system and a camera device.

BACKGROUND OF THE INVENTION

In some cases, a camera device used in a monitoring system may fail to capture a video-image due to changes in the photographing environment such as a camera failure or a lighting failure, camera tampering such as blocking or covering the lens of a camera, or the like.

Conventionally, the camera device may automatically detect some failures, but cannot automatically detect all abnormalities in image data. As an example, in a case where a dark image is outputted from the camera device, it is difficult to distinguish whether a camera failure occurs or an image of a dark object is captured. Meanwhile, if there is an observer, the observer can comprehensively determine the presence or absence of abnormalities while estimating the cause of the abnormality by empirically understanding the photographing environment.

In the related art, there is disclosed a solid-state pick-up device which is capable of detecting a failure, such as a case where no signal for the failure is outputted from an image sensor, even under the dark environment (see, e.g., Patent Document 1 or 2).

Patent Document 1: Japanese Patent Application Publication No. 2009-118427

Patent Document 2: Japanese Patent Application Publication No. 2006-033385

In a large-scale monitoring system, it is difficult for the observer to visually and immediately detect video-image abnormalities of all camera devices. Further, visual observation of the observer is not suitable practically for a small-scale monitoring system which is required to save manpower. In the case of a surveillance system for an unmanned store, a recorded video-image may be checked by the observer only when an incident has occurred without usually monitoring the store. In this case, video-image abnormalities may not be detected until the recorded video-image is visually checked at the time of the occurrence of the incident, which is problematic.

However, a damage of the camera device or the like needs to be detected more reliably and more rapidly, as a potential threat to be monitored, by using other camera devices.

In view of the above, the present invention aims to automatically detect an abnormality of image data caused by a failure of a camera device or the like by using a low-load video signal processing.

SUMMARY OF THE INVENTION

According to one aspect of the present invention, there is provided a monitoring system which is conceptually configured to determine an abnormality by using an appropriate algorithm in which an object having a predetermined illuminance (luminance) is ensured in an imaging angle of view of the camera and it is determined whether or not incident light of the object can be retrieved while changing photographing conditions such as an aperture and an exposure time. More specifically, the monitoring system includes a plurality of camera devices and a server connected to the camera devices through a network. Each of the camera devices includes an image sensor unit and a measurement unit, and the measurement unit is configured to divide image data acquired by the image sensor unit into a plurality of areas, and detect a video-image abnormality from a mean value of a luminance signal and a change in the mean value of the luminance signal in each of the areas. Further, each of the camera devices is configured to transmit detection information of the video-image abnormality to the server when the measurement unit detects the video-image abnormality.

Further, according to another aspect of the present invention, there is provided a camera device including an image sensor unit and a measurement unit. The measurement unit is configured to divide image data acquired by the image sensor unit into a plurality of areas, and detect a video-image abnormality from a mean value of a luminance signal and a change in the mean value of the luminance signal in each of the areas.

Further, a camera device according to still another aspect of the present invention is the camera device described above, and the measurement unit detects the video-image abnormality after removing a moving object in a measurement area from the image data acquired by the image sensor unit.

Effect of the Invention

According to the present invention, it is possible to efficiently detect video-image abnormalities from a plurality of camera devices without an observer's visual observation.

BRIEF DESCRIPTION OF THE DRAWINGS

FIG. 5 is a flowchart of algorithm B for the failure detection of the measurement unit 22.

FIG. 8 is a flowchart of algorithm C for the failure detection of the measurement unit 22.

DETAILED DESCRIPTION OF THE EMBODIMENTS

Figure 1:
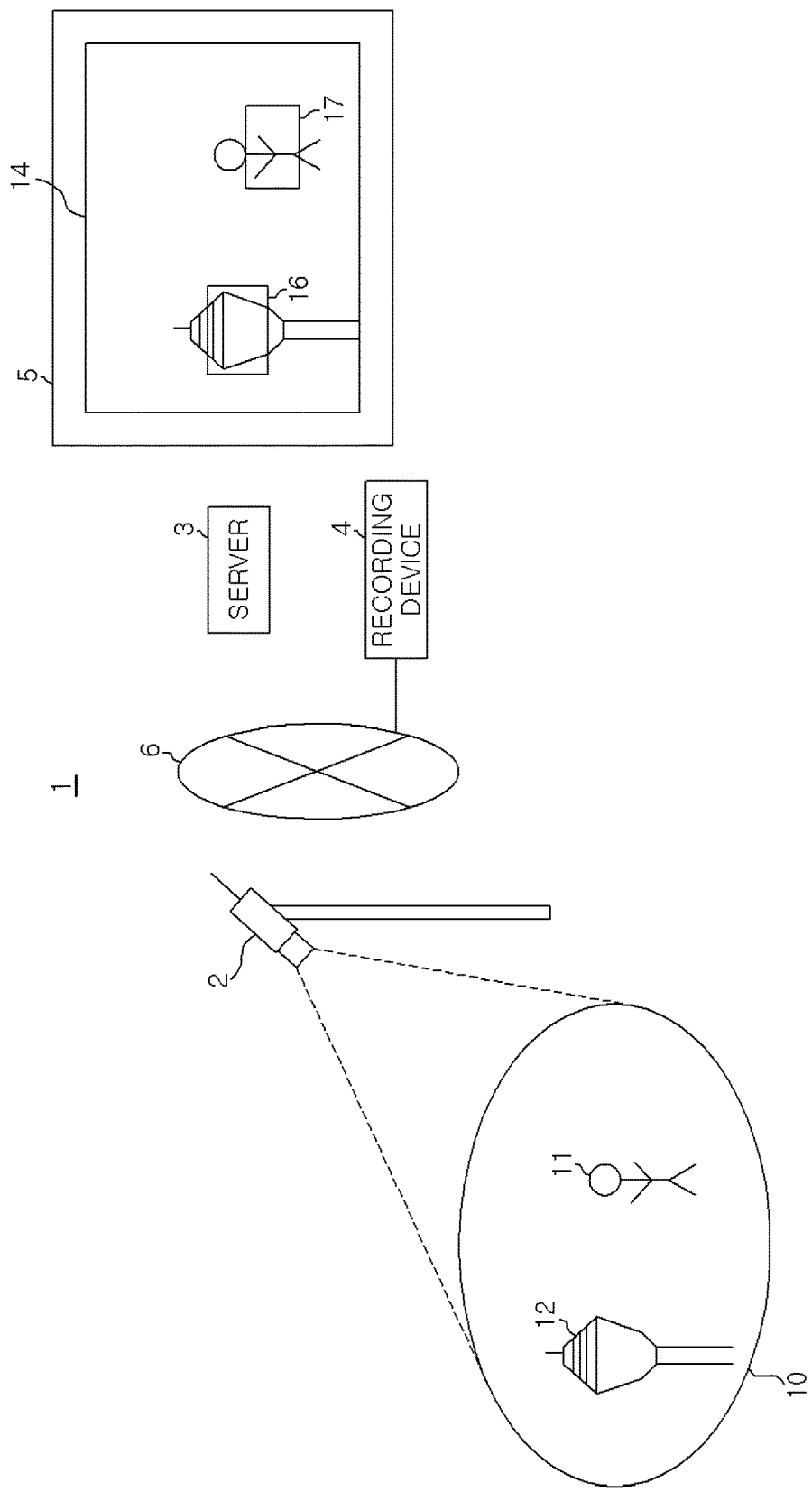
FIG. 1 shows a schematic configuration of a monitoring system 1 according to one embodiment of the present invention.

FIG. 1 shows a schematic configuration of a monitoring system according to one embodiment of the present invention. A monitoring system 1 is configured such that a plurality of internet protocol (IP) cameras (network cameras) 2 are connected to a server 3 and a recording device 4 through a network 6.

Each IP camera 2 is fixedly installed to capture a video-image in a monitoring area 10. Specifically, the IP camera 2 captures a moving object such as a human being 11 and a stationary object such as a street lamp 12, for example.

A server 3 transmits, for example, an instruction of video-image delivery to the IP camera 2 to display an alarm and/or the video-image received from the IP camera 2 on a display device 5 connected to the server 3. In addition, the server 3 performs monitoring of an operation of the IP camera 2, remote controlling of the light lamp built in the IP camera 2, integration of received alarms and the like. Further, the server 3 provides a screen 14 for setting a plurality of measurement areas 16 and 17 which will be described later by a manipulation of the user.

The recording device 4 includes a large-capacity storage medium such as a hard disk drive (HDD) and is configured to record video data delivered from the IP camera at all times or in response to the alarm. Further, in response to a request from the server 3, the recording device 4 reads out the recorded video data to transmit it to the server 3.

The display device 5 is a general computer display. FIG. 1 shows a state in which the display device 5 displays the measurement area setting screen 14. In the measurement area setting screen 14, the measurement areas 16 and 17 which are arbitrarily set by the user are displayed as rectangles.

Figure 2:
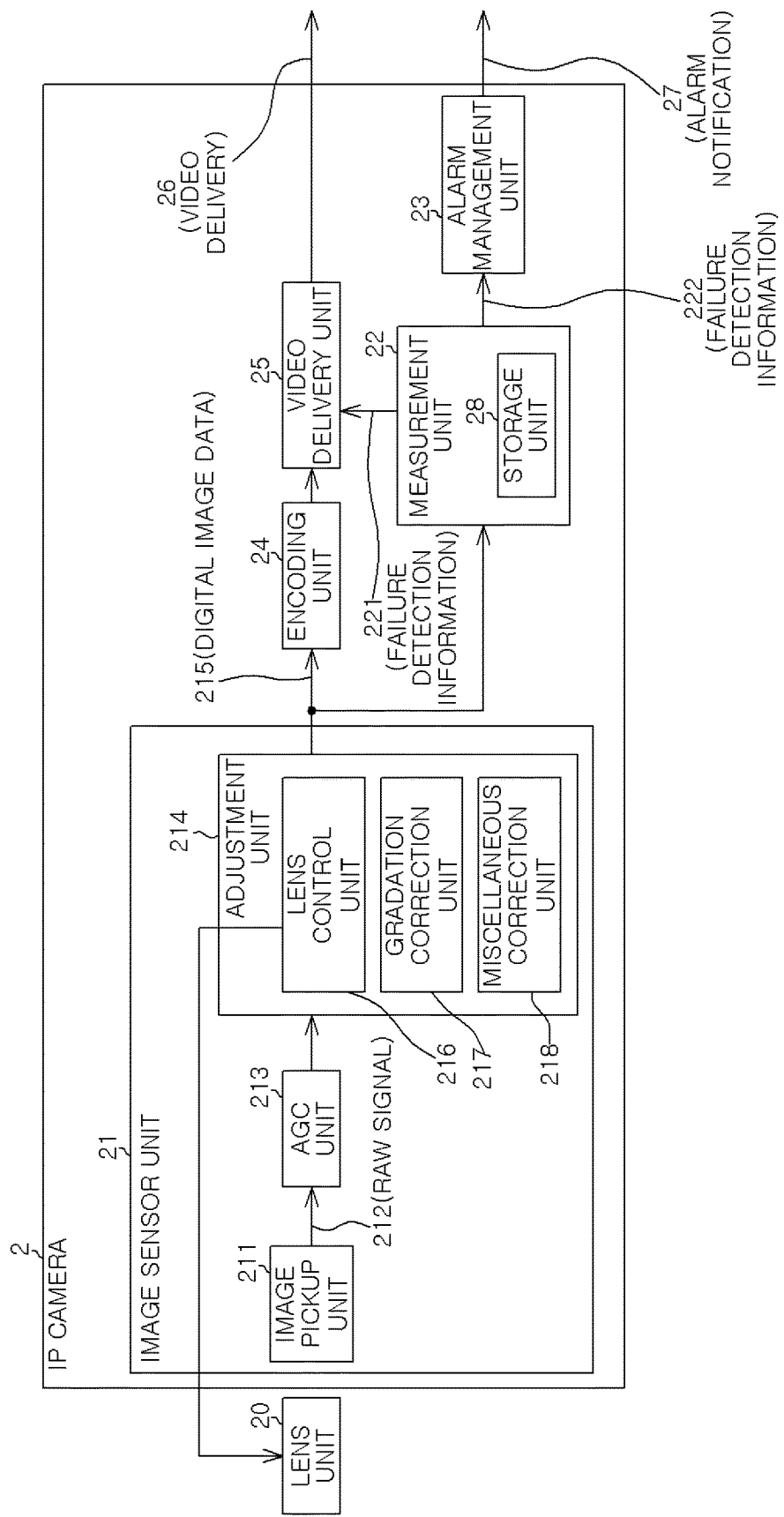
FIG. 2 is a block diagram of an IP camera 2 included in the monitoring system 1.

FIG. 2 is a block diagram of the IP camera 2.

The IP camera 2 includes an image sensor unit 21, an encoding unit 24, a measurement unit 22, a video delivery unit 25, and an alarm management unit 23.

The image sensor unit 21 is a generally available camera module and includes an image pickup unit 211, an automatic gain control (AGC) unit 213, and an adjustment unit 214 to output digital data of the captured video-image.

The image pickup unit 211 is configured to photoelectrically convert light condensed by a lens unit 20 to output the converted electrical signal to the AGC unit 213 as a raw image format (RAW) signal 212.

The AGC unit 213 amplifies the RAW signal 212 to a predetermined level to output the amplified RAW signal to the adjustment unit 214. The image pickup unit 211 may be a complementary metal oxide semiconductor (CMOS) image sensor, and the AGC unit 213 may be provided in the image pickup unit 211 if the image pickup unit 211 outputs the analog-to-digital converted RAW signal.

The adjustment unit 214 is a central processing unit of the IP camera 2 which performs an image capturing control or an image processing such that the IP camera 2 outputs a desirable video-image. The adjustment unit 214 includes a lens control unit 216, a gradation correction unit 217, and a miscellaneous correction unit 218.

The lens control unit 216 is configured to control the iris and focus of the lens unit 20 based on image data outputted from the AGC unit 213.

A gradation correction (equalization) for the image data outputted from the AGC unit 213 is performed by the gradation correction unit 217. A color correction, an adaptive noise-filtering, a flicker removal, an edge enhancement and the like for the image data outputted from the AGC unit 213 are performed by the miscellaneous correction unit 218 to output the corrected image data as digital image data.

The encoding unit 24 is configured to encode the digital image data outputted from the image sensor unit 21 to thereby generate encoded image data of a predetermined format such as joint photo graphic experts group (JPEG), H.264 or the like.

The video delivery unit 25 is configured to deliver the encoded image data by using user datagram protocol/internet protocol (UDP/IP) or the like.

The measurement unit 22 is configured to detect a failure through a method which will be described later and output failure detection information 221 and 222 based on the digital image data 215 outputted from the image sensor unit 21. The measurement unit 22 includes a storage unit 28 which stores the digital image data 215 or values calculated from the digital image data 215.

The failure detection information 221 is included in the encoded image data by the video delivery unit 25 and is delivered through a network 6.

The failure detection information 222 is managed by the alarm management unit 23 and is sequentially outputted through the network 6 as an independent alarm notification 27.

With regard to the failure detection information 221, the failure detection information 221 is integrated into the encoded image data, so that the failure detection information 221 can be reliably delivered and recorded even with the conventional device. With regard to the failure detection information 222, there is an advantage that an alarm can be recognized at the receiving side without interpreting contents of the encoded image data. Therefore, in this example, the information is redundantly delivered.

Figure 3:
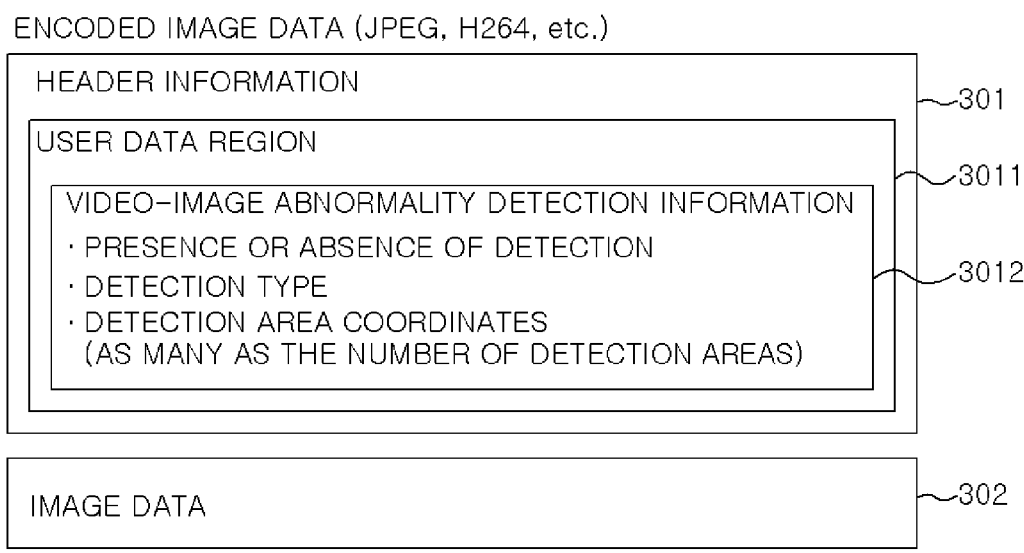
FIG. 3 shows a structure of encoded image data used in the monitoring system 1.

FIG. 3 shows a structure of encoded image data used in the monitoring system 1 of the present embodiment.

Encoded image data 26, which is generally provided on a picture basis or the like, includes header information 301 and image data 302.

The image data 302 is a bit stream generated by the encoding such as two-dimensional Huffman coding, context adaptive binary arithmetic coding (CABAC) or context adaptive variable length coding (CAVLC) in the encoding unit 24.

The header information 301 stores therein attributes (e.g., picture size and so on) of the image data in unit and parameters (e.g., quantum conversion table and so on) used in the encoding, and usually has a user data area 3011 which can be arbitrarily used. In this example, video-image abnormality detection information 3012 is stored in the user data area 3011.

The failure detection information 221 may be an example of the video-image abnormality detection information 3012. The video-image abnormality detection information 3012 may include a presence or absence (or probability) of detection, a detection type, and detection area coordinates, which are provided to correspond to the number of the detection areas.

Hereinafter, there will be described several algorithms of the failure detection by the measurement unit 22. These algorithms may be implemented alone or in combination. In the latter case, the algorithms may be implemented in parallel. Alternatively, one algorithm may be dependent on another algorithm such that upon detecting a failure by executing one algorithm, another algorithm is executed so as to double-check the detection result.

(Algorithm A)

Figure 4:
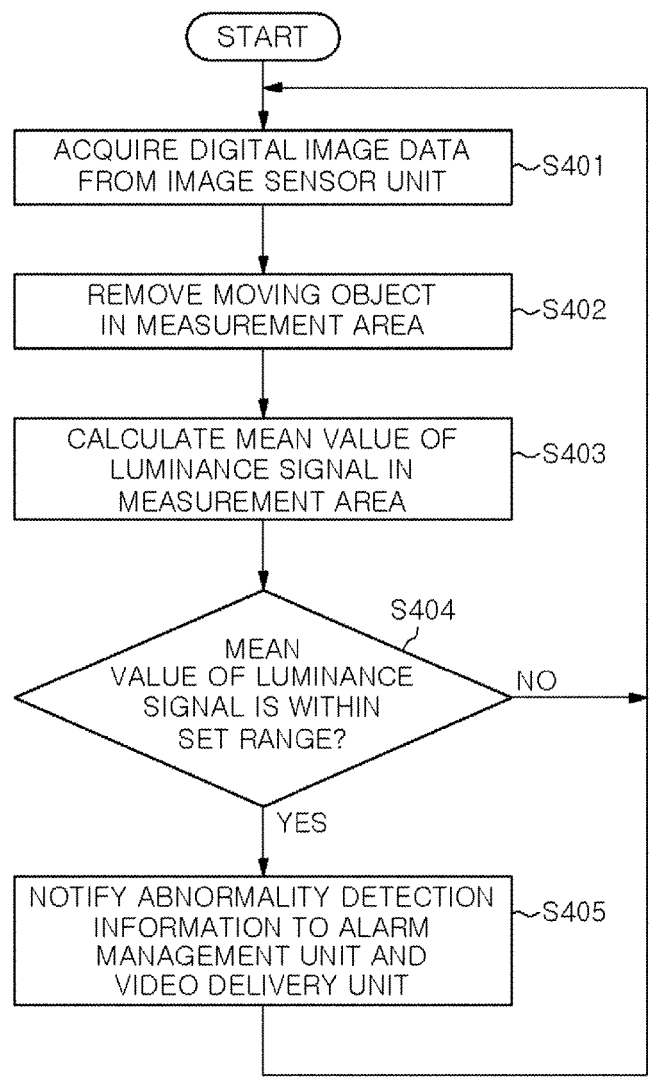
FIG. 4 is a flowchart of algorithm A for a failure detection of a measurement unit 22.

FIG. 4 is a flowchart of algorithm A. Algorithm A is used for determining that an abnormality has occurred when there is a change in a mean value of a luminance signal within a measurement area. The measurement area and a set range (threshold) for determining the abnormality when there is a change in the mean value of the luminance signal are determined in advance to correspond to, e.g., those of the street lamp 12 which is expected to provide constant illuminance. For example, when the street lamp 12 is in a turn-on state in FIG. 1, it is assumed that there is no luminance change in an image capturing area of the street lamp 12, so that it can be employed as the measurement area 16.

The measurement unit 22 acquires the latest digital image data of one picture that is outputted from the image sensor unit 21 (step S401), and the process proceeds to step S402.

In step S402, a removal or a masking of the moving object in the measurement area is performed by using digital image data (background image) stored in the storage unit 28, and the process proceeds to step S403. Alternatively, when the moving object is detected in the measurement area, the process for the corresponding picture may be aborted. The removal of the moving object can be performed by a well-known technique which is available in the art.

In step S403, the mean value of the luminance signal in the measurement area is calculated, and the process proceeds to step S404.

In step S404, the mean value of the luminance signal is converted into absolute illuminance and it is determined whether or not the mean value of the luminance signal is out of the set range. If it is determined that the mean value of the luminance signal is out of the set range (YES in step S404), then the process proceeds to step S405. If it is determined that the mean value of the luminance signal is within the set range (NO in step S404), then the process returns to step S401. The absolute illuminance in the measurement area is obtained by multiplying the mean value of the luminance signal by a coefficient determined by an AGC gain, an exposure time (shutter speed) and an aperture value (f-number).

In step S405, since the mean value of the luminance signal is out of the set range, it is determined that there is an abnormality in the digital image data 215 and the process returns back to step S401 after the failure detection information 221 is notified (outputted) to the video delivery unit 25 and the failure detection information 222 is notified (outputted) to the alarm management unit 23.

Upon receiving the failure detection information 222, the alarm management unit 23 transmits an alarm to the server 3. The server 3 performs a process of, e.g., displaying a warning message upon receiving the alarm. Further, since the failure detection information 221 is recorded together with the video-image in the recording device 4, it becomes possible to check video-images before and after the video-image having the abnormality by searching information on the video-image abnormality in the recorded video-image.

In algorithm A, since an accurate operation can be performed only when the street lamp 12 is in a turn-on state, a measurement schedule is set to correspond to a time period during which the street lamp is turned on. Meanwhile, in a case where the street lamp 12 is a lighting device which may cause a flickering, the mean value of the luminance signal is preferably subjected to averaging even in the time domain as many as the number of pictures corresponding to a flickering cycle. The flickering cycle can be detected in the miscellaneous correction unit 218 or the like by techniques well known in the art.

According to algorithm A, it is possible to detect the covering of the lens unit 20 that is caused by, e.g., mischief or the like.

(Algorithm B)

FIG. 5 is a flowchart of algorithm B. Algorithm B is used for determining that an abnormality has occurred when there is no change in a mean value of a luminance signal within a measurement area. In this example, in the imaging angle of view (field of view), there is an object with illuminance (luminance) being changed (blinking) at a known timing. The measurement area and a predetermined time period for determining the abnormality and a specific value for the amount of change in the mean value of the luminance signal are determined in advance so as to correspond to those for the object. The object includes an object that is illuminated by the light lamp (visible ray or near-infrared ray) equipped in the IP camera 2 or an external lighting device operated with the AC power supply frequency. Alternatively, the object may be the light lamp itself equipped in another IP camera 2.

The measurement unit 22 acquires the latest digital image data of one picture that is outputted from the image sensor unit 21 (step S501), and the process proceeds to step S502.

In step S502, the mean value of the luminance signal in the measurement area is calculated, and the process proceeds to step S503.

In step S503, it is determined whether or not the amount of change in the mean value is smaller than or equal to the specific value by comparing a mean value of the luminance signal of the digital image data 215 with a mean value of the luminance signal of the previous digital image data stored in the storage unit 28. If the amount of change in the mean value is smaller than or equal to the specified value (YES in step S503), it is determined that there is a potential abnormality so that the process proceeds to step S504. If the amount of change in the mean value is greater than the specified value (NO in step S503), it is determined as normal so the process returns back to step S501.

In step S504, it is determined whether or not a state where there is no change in the mean value of the luminance signal (that is, the amount of change is smaller than or equal to the specific value) is maintained for the predetermined time period. If the no-change state is maintained for the predetermined time period (YES in step S504), it is determined as abnormal so that the process proceeds to step S505. If the no-change state is not maintained for the predetermined time period (NO in step S504), the process returns back to step S501. The predetermined time period is set based on the flickering period, a blinking pattern period of the lighting device itself, or a time period according to an error in the known change timing.

In step S505, it is determined that there is an abnormality in the digital image data 215 and the process returns back to step S501 after the failure detection information 221 is notified (outputted) to the video delivery unit 25 and the failure detection information 222 is notified (outputted) to the alarm management unit 23.

In this example, by using the variation of the lighting device causing the flickering, it is determined as abnormal when the flickering is no longer observed. Therefore, it is suitable for an indoor environment. When no human being is present so that the lighting device is turned off, the near-infrared lighting device equipped in the IP camera 2 or the like is controlled from the server 3 to be turned on, so that the operation of the failure detection can be continued. Alternatively, if it is preferable to optionally perform the failure detection, the algorithm B may be implemented only when the lighting device is turned on and off.

Alternatively, it is preferable to use the measurement area 16, which is specified as an area in which the luminance of the image is frequently changed (e.g., a hallway where there is a movement of the human being 11). In this case, the time period (e.g., commuting time zone) during which the human being passes by is used to set the measurement schedule.

(Algorithm C)

FIGS. 7A to 7D are schematic views for explaining a principle of algorithm C and FIG. 8 is a flowchart of algorithm C. Algorithm C relates to a method for automatically setting the measurement area mentioned above. Specifically, in the method, an image frame (picture) is divided into a plurality of measurement areas, and areas suitable for the measurement areas 16 and 17 are specified by observing an aspect of the luminance change (a period or a width thereof) in a normal state.

Graphs shown in FIGS. 7A to 7D represent a change of the mean value of the luminance signal over time in each of the measurement areas 711 to 713, where a horizontal axis indicates time, and a vertical axis indicates the mean value of the luminance signal.

Figure 7A:
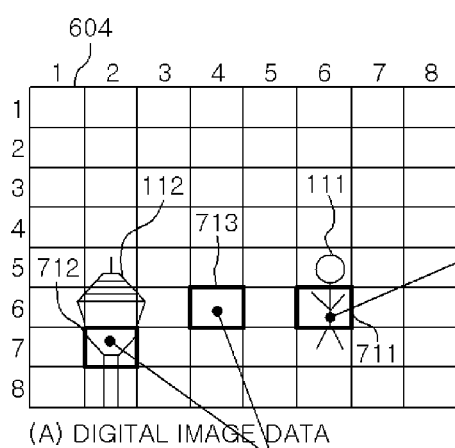
FIGS. 7A to 7D are schematic views for explaining a principle of algorithm C in the measurement unit 22.

As shown in FIG. 8, the measurement unit 22 measures the change of the mean value of the luminance signal in each measurement area for a predetermined time period (e.g., one day) and stores the measurement result in the storage unit (step S801). The plurality of the measurement areas are obtained by dividing the digital image data into N×M (e.g., (rows)×8 (columns)) areas as shown in FIG. 7A. The IP camera 2 itself sets the measurement period of, e.g., about one day after the installation thereof.

In step S802, the statistics of the mean value of the luminance signal are obtained for each measurement area. The statistics include a longest time period during which a state where there is no change in the mean value of the luminance signal is maintained, and the minimum and maximum values of the mean value of the luminance signal, and these statistics are stored in the storage unit 28 after the predetermined time period has lapsed. Steps S801 and S802 are generally performed in parallel. For example, the longest time period can be obtained by a method in which the measurement unit 22 counts a time period for no change and resets the count value to zero when there is a change, and the measurement unit 22 overwrites the count value when the count value is greater than a previous count value stored in the storage unit 28. Preferably, when the overwriting is carried out, a previous reset time may be stored so that the previous reset time (the one before the current reset causing the overwriting) and the current reset time are also overwritten and stored. Further, 'the state where there is no change in the mean value of the luminance signal' may indicate that the change is less than 10% of the rating value.

In step S804, it is determined, for each measurement area, whether or not a level change constantly occurs in the mean value of the luminance signal. For a measurement area in which the level change constantly occurs (YES in step S804), a process in step S807 is performed. For a measurement area in which the level change does not constantly occur (NO in step S804), a process in step S805 is performed. Here, when the longest time period obtained in step S802 is equal to or less than a predetermined threshold, it is determined that the level change constantly occurs in the mean value of the luminance signal.

In step S805, it is determined, for each measurement area, whether or not the level change hardly occurs in the mean value of the luminance signal. If it is determined that the level change hardly occurs (YES in step S805), then the process proceeds to step S808. If it is determined that the level change occurs but does not constantly occur (NO in step S805), then the process proceeds to step S806. Here, when the ratio of the maximum value and the minimum value obtained in step S802 is equal to or smaller than a predetermined value (i.e., close to 1), it is determined that the level change hardly occurs in the mean value of the luminance signal.

In step S806, the measurement area is not specified. The measurement area such as a measurement area 713 shown in FIG. 7A, which is subjected to step S806, indicates an area to which any one of algorithms A and B cannot be appropriately applied.

Figure 7B:
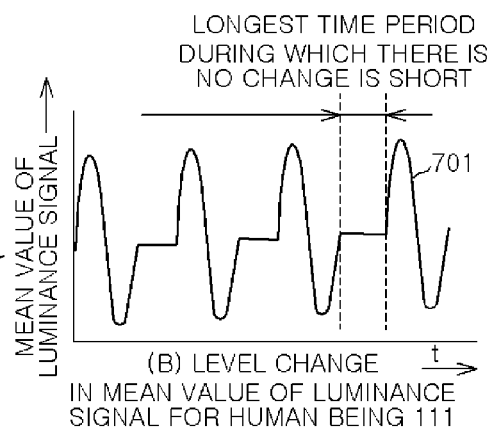
Figure 7C:
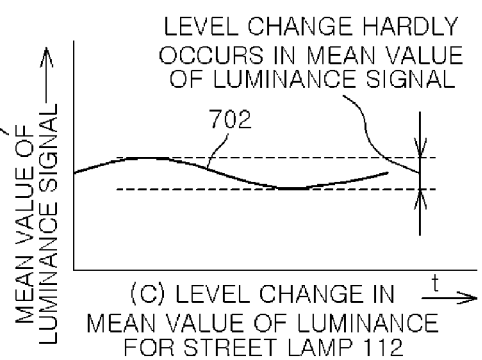
Figure 7D:
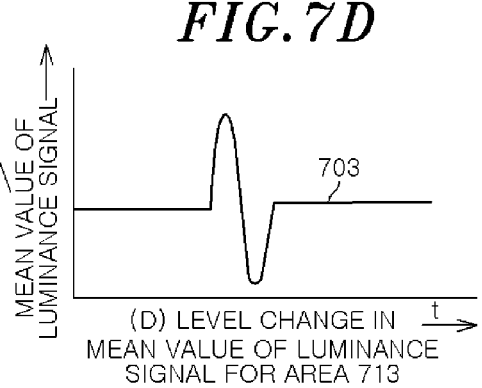

In step S807, the measurement area such as a measurement area 711 shown in FIG. 7A in which the level change constantly occurs in the mean value of the luminance signal becomes subjected to step S807. Thus, this measurement area is specified as an area to which algorithm B (a means for determining it as abnormal when there is no change in the mean value of the luminance signal) is to be applied. At this time, since the longest time period during which there is no change in the mean value of the luminance signal is known for this measurement area, the predetermined time period used in step S504 of algorithm B may be automatically set by adding a predetermined margin to the longest time period. For example, if it can be known that there is an area in which there is no change in the mean value of the luminance signal for 5 minutes in maximum or less (that is, there is a movement within 5 minutes), the method for determining it as abnormal when there is no change in the mean value of the luminance signal is used to monitor this area. The graph 701 in FIG. 7B represents the above-described case.

In step S808, the measurement area such as a measurement area 712 shown in FIG. 7A in which the level change hardly occurs in the mean value of the luminance signal becomes subjected to step S808. Thus, this measurement area is specified as an area to which algorithm A (a means for determining it as abnormal when there is a change in the mean value of the luminance signal) is to be applied. At this time, since the minimum and maximum values of the mean value of the luminance signal are known for this measurement area, an upper limit and a lower limit of the set range used in step S404 of algorithm A may be automatically set by adding a predetermined margin to each of the minimum and maximum values. It is significant to set the maximum value since the abnormality due to, e.g., a deterioration of the image pickup unit may include a phenomenon such as white-black inversion in addition to a decrease in sensitivity.

(Algorithm D)

Figure 6A:
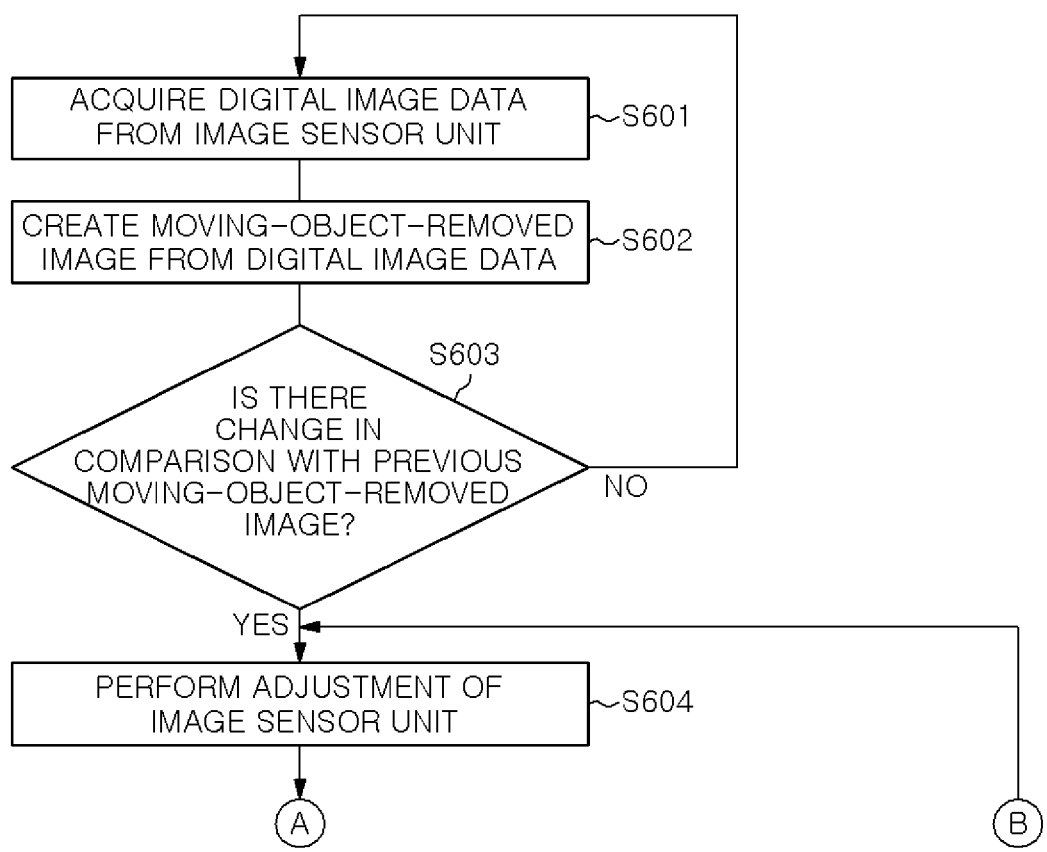
FIGS. 6A and 6B are a flowchart of algorithm D for the failure detection of the measurement unit 22.
Figure 6B:
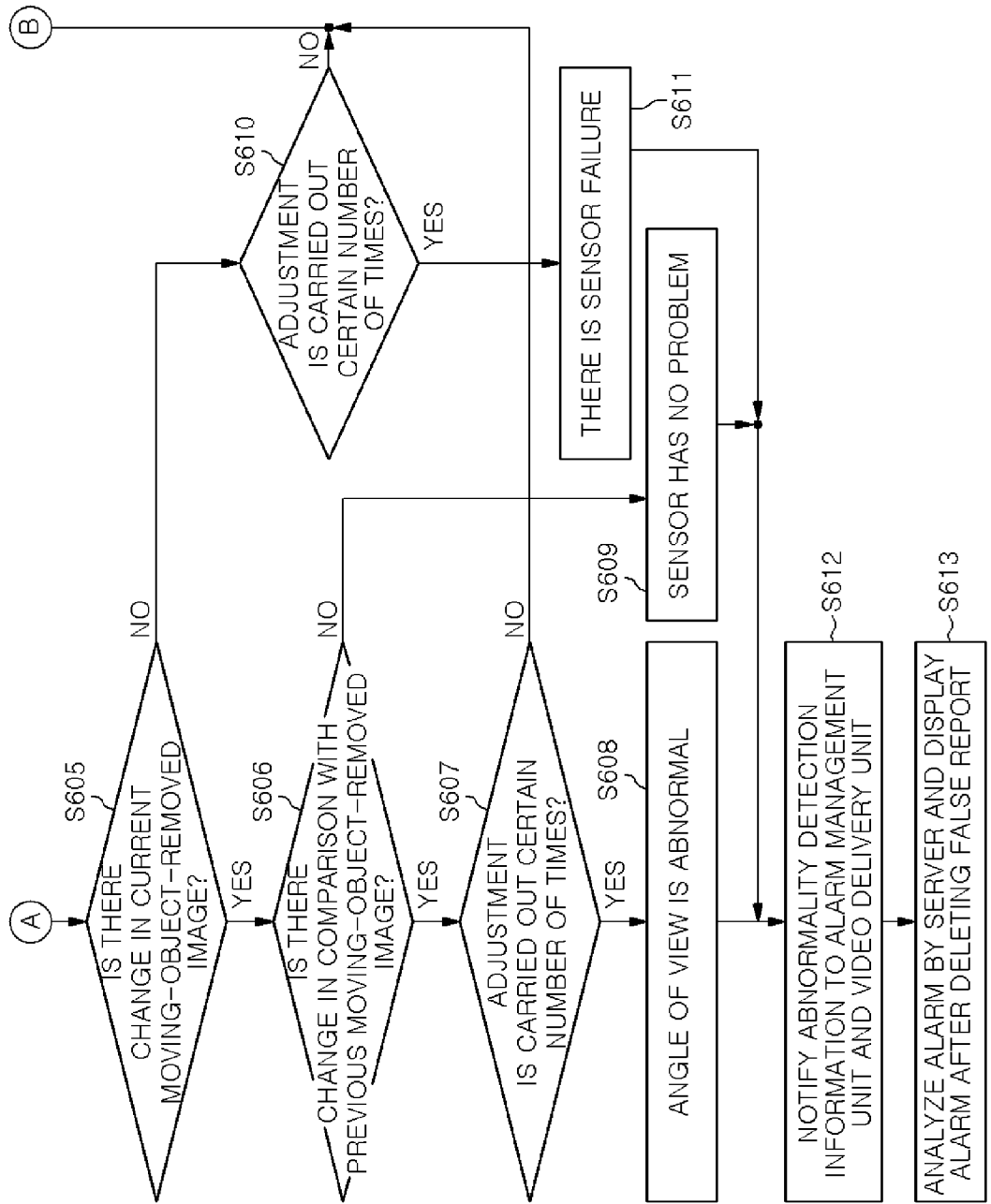

FIGS. 6A and 6B are a flowchart of algorithm D. Algorithm D is applied to determine the failure of the image sensor unit when there is no change in a video-image in which a moving object is removed after adjustments of an iris and a gain (exposure time and pixel gain) of the image sensor unit, which bring a change in the captured video-image.

In step S601, the measurement unit 22 acquires the latest digital image data of one picture that is outputted from the image sensor unit 21.

Next, in step S602, similarly to step S402, an image with the moving object removed or masked is created from the acquired digital image data.

Next, in step S603, the moving-object-removed image in step S602 is compared with a previous moving-object-removed image (fixedly stored or previously updated) in the storage unit 28, and if a difference therebetween does not exceed a threshold, then the process proceeds to step S601. If the difference therebetween exceeds the threshold, then the process proceeds to step S604. Here, the difference can be calculated by the sum of absolute differences. Moreover, the moving-object-removed image may be updated by, e.g., the weighted addition of two compared moving-object-removed images and stored in the storage unit 28. However, when it is intended to detect the decrease in sensitivity due to the aging deterioration in step S603, the update should not be carried out.

Further, the processing of step S603 is not essential, and step S602 and subsequent step S604 may be carried out periodically by the schedule specified in advance.

In step S604, for example, the iris of the image sensor unit 21 is adjusted and changed. This adjustment may be performed through the lens control unit 216 either by autonomously sensing a change in the digital image data or based on instructions from the measurement unit 22 to the lens control unit 216. The instructions from the measurement unit 22 may include an instruction to compensate the change in the video-image detected in step S603, a completely unrelated instruction (noise) and the like. Although it is not essential, the measurement unit 22 may be able to realize which direction a control amount has been changed with respect to which type of a lens unit.

Next, in step S605, after the adjustment of the image sensor unit 21 is carried out, a moving-object-removed image is newly created by performing the same processing as steps S601 and S602, and the current moving-object-removed image is compared with the one before the current moving-object-removed image (e.g., the moving-object-removed image created in step S602). Here, since the photographing conditions are changed, it is a normal when there is a change. When there is no change, the process proceeds to step S610. Further, the update of the moving-object-removed image is not carried out after the adjustment of the image sensor unit 21 is carried out.

In step S606, the current moving-object-removed image in step S602 is compared with a previous moving-object-removed image stored before the adjustment of the image sensor unit 21 in the storage unit 28, and the process proceeds to step S601 when the difference therebetween does not exceed a predetermined threshold. Here, "the difference therebetween does not exceed a predetermined threshold" indicates that the control amount with respect to the image sensor unit returns to its original level or is fixed to correspond to changes in the photographing environment. The difference in step S606 may be a difference after a high pass filtering (HPF) or an edge detection instead of a difference of the pixel value itself (SAD), or may be a difference obtained by performing such filtering process on a differential image which is not subjected to the sum of absolute differences.

Next, in step S607, it is determined whether or not the adjustment of the image sensor unit has been performed a certain number of times or more. The process proceeds to step S604 when such adjustment is carried out less than the certain number of times. This provides a loop process that can exit to step S609 from step S606 in case where the sensor is normally operated. When such adjustment is carried out the certain number of times, the process proceeds to step S608. Although the control amount with respect to the image sensor unit 21 is changed for each adjustment, a random walk or an addition of a random walk to a change in a direction to reduce the difference with respect to the previous moving-object-removed image may be applied. Moreover, there is some delay after the control amount with respect to the image sensor unit 21 is changed until the image data based thereon is obtained. It is preferable that the time required to perform the certain number of adjustments is set to be sufficiently longer than the delay.

In step S608, when the image does not return to its original state after the change is recognized in step S603, it is determined that the angle of view is abnormal. Here, the abnormality of the angle of view includes external factors such as a blindfold, lens damage, stoppages of some of lighting devices and the like other than a sensor issue such as a change of a video-image capturing direction. In this case, it is highly possible that the sensor is not completely failed and is in operation to capture an image of something. However, a partial failure of the sensor (i.e., reading failure of some of the pixel values) can be included in the abnormality of the angle of view. Then, abnormality detection information such as a detection type indicating a type of the abnormality of the angle of view is generated. Further, if necessary, the abnormality detection information such as a detection area (i.e., a region having a large number of pixels having values different from those in the previous moving-object-removed image) may also be generated.

In step S609, it is determined that the sensor has no problem.

In step S610, it is determined whether or not the proceeding from S605 to step S610 has occurred continuously a certain number of times or more (or it is determined whether or not the adjustment of the image sensor unit (step S604) has been performed a certain number of times or more). The process proceeds to step S604 when it does not reach the certain number of times.

In step S611, since the image does not change at all even though the image sensor unit is adjusted after the change is recognized in step S603, it is determined that there is a failure of the sensor. Here, the failure of the sensor also includes an event that a video-image is suddenly frozen or blacked out in a large part of a frame and an event that a video-image is constantly and terribly fluctuated on a pixel-by-pixel basis. In such video-image, the removal of the moving object is always employed in a large part of the frame to thereby replace the previous removal of the moving object, the process proceeds to step S611. Then, abnormality detection information such as a detection type indicating the failure of the sensor is generated. Further, in step S611, it is determined that there is the failure of the sensor even when all of the lighting devices in the monitoring area are turned off due to a power failure or the like.

In step S612, the detection information (e.g., the failure detection information 221 and 222) obtained in step S608, step S609 or step S611 is transmitted to the alarm management unit 23 and the video delivery unit 25.

In step S613, alarms are aggregated in the server 3 which is capable of receiving the alarms from a plurality of the IP cameras 2 to be displayed on the display device 5. For example, if it can be estimated that an external or a single cause generates the multiple alarms at substantially the same time, the multiple alarms can be aggregated into a single alarm. For example, if sensor-failure alarms are simultaneously generated from a plurality of cameras, it is highly possible that lighting devices are turned off or a power failure occurs. Even in case where abnormalities in the angle of view are simultaneously generated, it can be estimated that environmental changes such as an earthquake or illuminance changes in a wide area over a plurality of the monitoring areas have occurred. If it has been experienced and studied that such events are generated frequently or at a fixed time, such alarms can be deleted instead of being displayed. In addition, in a single camera, if alarms are generated from both of the measurement areas subjected to algorithms A and B at substantially the same time, it can be determined that it is highly possible that at least one of an abnormality in the angle of view and a sensor failure is generated in the corresponding single camera.

According to the embodiments described above, the monitoring system of the present invention is capable of detecting video-image abnormalities of all of the camera devices even in large-scale monitoring systems.

Although the present invention is described in detail above, the present invention is not limited to the monitoring system described above and may be widely applied to other monitoring systems.

What is claimed is:

1. A camera device comprising:
an image sensor unit; and a measurement unit configured to:
divide image data acquired by the image sensor unit into a plurality of areas; measure a change in a mean value of a luminance signal in each of the areas for a predetermined time period,
store a longest time period during which a state where there is no change in the mean value of the luminance signal is maintained, and a minimum value and a maximum value of the mean value of the luminance signal for the predetermined time period after the predetermined time period has lapsed;
when the longest time period is equal to or less than a preset threshold, determine that the change constantly occurs and specify a corresponding area as a first measurement area, wherein the first measurement area is determined to have a video-image abnormality when there is no change in the mean value of the luminance signal in the first measurement area; and
when a ratio of the maximum value and the minimum value is equal to or smaller than a preset value, specify a corresponding area as a second measurement area, wherein the second measurement area is determined to have a video-image abnormality when there is a change in the mean value of the luminance signal in the second measurement area.

2. A monitoring system comprising:
a plurality of the camera devices described in claim 1; and
a server connected to the camera devices through a network,
wherein each of the camera devices is configured to transmit information of the video-image abnormality to the server when the measurement unit determines that the video-image abnormality has occurred.

* * * * *